(12) United States Patent  
Morando

(10) Patent No.: US 6,532,640 B1  
(45) Date of Patent: Mar. 18, 2003

(54) BLIND ASSEMBLY PROCESS FOR AT LEAST ONE COMPONENT AND DEVICE FOR IMPLEMENTING THIS PROCESS

(75) Inventor: Patrick Morando, Nice (FR)

(73) Assignee: Mecaplast Sam, Monaco ( * ) Notice: Subject to any disclaimer, the term of this patent is extended or adjusted under 35 U.S.C. 154(b) by 52 days.

(21) Appl. No.: 09/656,217

(22) Filed: Sep. 6, 2000

(30) Foreign Application Priority Data

Sep. 6, 1999 (FR) .............................................. 99 11121

(51) Int. Cl.⁷ ................................................. B23P 21/00
(52) U.S. Cl. ............................ 29/469; 29/464; 29/281.5
(58) Field of Search ......................... 29/469, 465, 464, 29/463, 281.5, 281.4, 455.1

(56) References Cited

U.S. PATENT DOCUMENTS 2,935,314 A    5/1960   Ford 5,283,937 A  *  2/1994   Uesugi
6,098,265 A  *  8/2000   Stojkovic et al.

FOREIGN PATENT DOCUMENTS

EP           0 903 286 A2    3/1999

* cited by examiner

Primary Examiner—Douglas Olms  
Assistant Examiner—Steve Blount  
(74) Attorney, Agent, or Firm—Nixon & Vanderhye

(57) ABSTRACT

The invention relates to a blind assembly process for at least one component and an assembly device. The blind assembly process for at least one component designed to be placed in a housing that is difficult to access comprises a step for the three-dimensional connection of the component using a link with a multifunction plate a step for formation of the means of positioning the multifunction plate in a first wall in which at least one hole is formed through which the link and the component can pass, the said link positioning the component in space so that once the plate has been positioned, the component is in position in the housing a step in which additional components are fixed onto the component.

17 Claims, 8 Drawing Sheets

Figure 1:
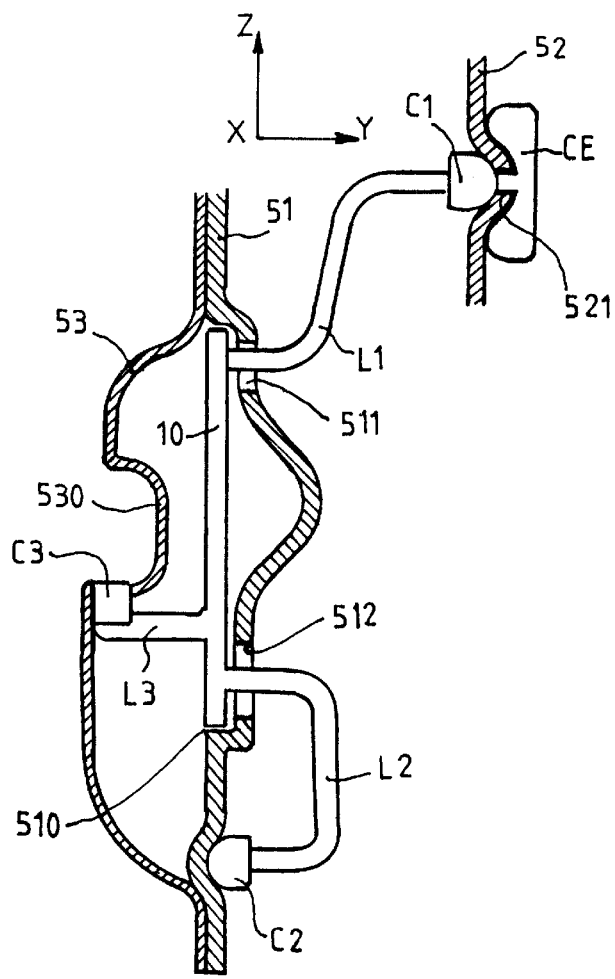

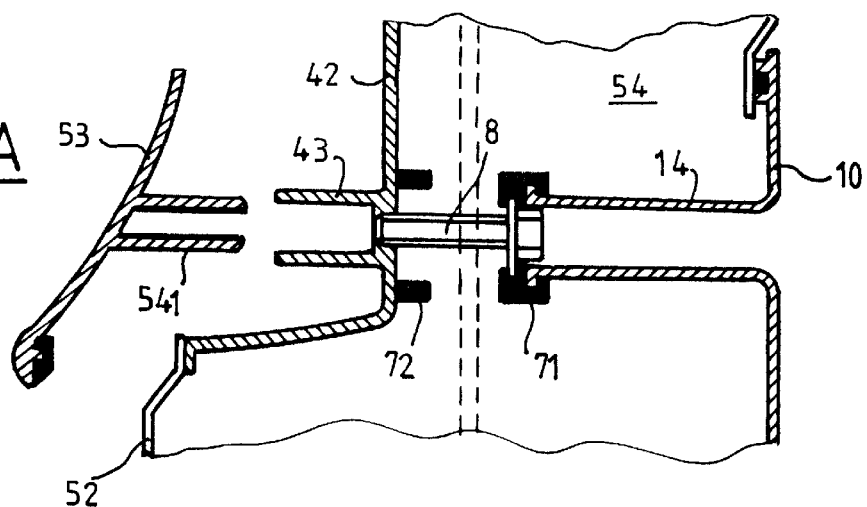
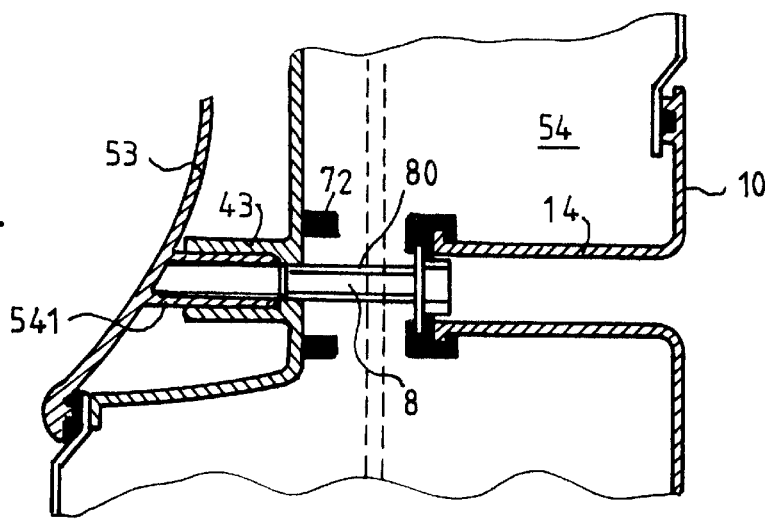
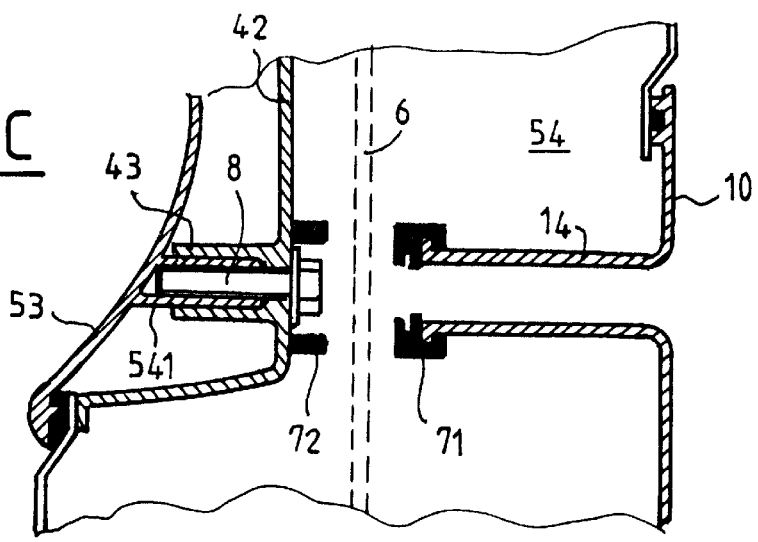

BLIND ASSEMBLY PROCESS FOR AT LEAST ONE COMPONENT AND DEVICE FOR IMPLEMENTING THIS PROCESS

This invention relates to a procedure for the blind assembly of at least one component and a device for implementing this process. Blind assembly of components is a problem that arises particularly for automobile manufacturers. In particular, this process and this device are used during assembly of a multifunction plate in an opening element for a vehicle. The opening element may be a vehicle side door or rear door.

It is known in prior art that the assembly of components located for example inside a door represents a problem. The space available for maneuvering components and tools for ensuring their adjustment is indeed restricted. Furthermore, some of these components, for example such as the external opening control, are in a position at which it is almost impossible to see them. Thus, operations for assembling these components are long and fastidious. There are serious risks of assembly errors.

Furthermore, the tendency of manufacturers to group several functions to be installed in the vehicle on multifunction plates further reduces accessibility for fitters.

Therefore, the first purpose of this invention is to overcome the disadvantages of prior art by proposing a process for blind positioning and assembly of components.

This purpose is achieved by the fact that the blind assembly process for at least one component to be placed in a location with difficult access comprises:

- a step for the three-dimensional connection of the component using a link with a multifunction plate,
- a step for formation of the means of positioning the multifunction plate in a first wall in which at least one hole is formed through which the link and the component can pass, the said link positioning the component in space so that once the plate has been positioned, the component is in position in the housing;
- a step in which additional components are added onto the component.

According to another feature, the housing is fixed to a second wall.

According to another feature, the second wall encloses a volume with the first wall.

According to another feature, the additional components are a cladding component and a maneuvering component.

According to another feature, the volume is a vehicle door.

According to another feature, the three-dimensional link is rigid along the X and Z axes, and can be made rigid along the Y axis using a key.

According to another feature, the multifunction plate is a vehicle door cassette.

According to another characteristic, the process for the blind assembly of a component in a volume forming an opening element defined by a first external wall and a second internal wall, is characterized in that it comprises:

- a step in which a component is made rigid on a multifunction cassette,
- a step in which the cassette is fixed in a housing provided on the second wall and in which a component is positioned on the inside face of the external wall of the opening element,
- a step in which the attachment is released,
- a step in which external maneuver and cladding components are assembled.

According to another feature, an opening element may be a side door or a rear door, the step in which the attachment is released frees the space between the two walls forming a well for a mobile element such as a window, and one of the components that will be installed is the functional part of an external opening control.

According to another feature, the process comprises a step for the assembly of an external part of the door open control comprising a maneuvering device and/or cladding on the outside of the door, the assembly being made by attachment onto the external opening control to clamp the wall between the outside part and the functional part of the external opening control.

According to another feature, a removable link comprises a rod comprising means firstly for locking it onto the second wall, and secondly onto one of the components that will be assembled in the inside of the volume, these locking means being unlockable after the component has been placed and fixed in the volume in order to leave the space between the two walls of the volume free.

According to another feature, the step in which the assembly formed by the cassette and all internal elements inside a vehicle door consists firstly of fixing each element to the door walls, and secondly when necessary, fixing at least one mechanism of each element to a mechanism of the cassette.

A second purpose of the invention is to propose a device for implementing the process according to the invention.

This second purpose is achieved by the fact that the device for assembly of at least one component on the inside of a vehicle opening element comprises removable means of connecting the component(s) with a cassette designed to be assembled on the opening element, the removable connection means being shaped to lock the component(s) to be assembled inside the opening element in rotation and in translation with respect to the cassette.

According to another feature, a removable connection means includes a rod comprising means for locking it firstly onto the cassette and secondly onto one of the components, these locking means being unlockable once all components have been placed in the door in order to leave the window sliding well free.

According to another feature, a retractable means includes a tapped sleeve with attachment means to form a link between the cassette and an internal component, the tapping in the sleeve being designed to cooperate with an attachment screw fastening the means to a wall in the door of one of the internal elements, the sleeve being retracted by turning the attachment screw when the inside element is fixed to the door.

According to another feature, the internal components of the door comprise firstly a functional part of an external opening control designed to be fixed to the inside surface of the plate forming the outside surface of the door, through an external part positioned on a stamped part of the external surface of the plate and attachment means forming the mechanical link between the external part and the functional part of the external opening control and/or secondly the door locking mechanism.

According to another feature, the external part is composed of a cladding and a gripping device.

According to another feature, the external wall of the door comprises an inset or a centering cutout for the external part, this external part comprising centering wells that penetrate into the spindles in the functional part of the external opening control, the wells being fitted with screw fastening the external part to the functional part of the external opening control.

Figure 4:
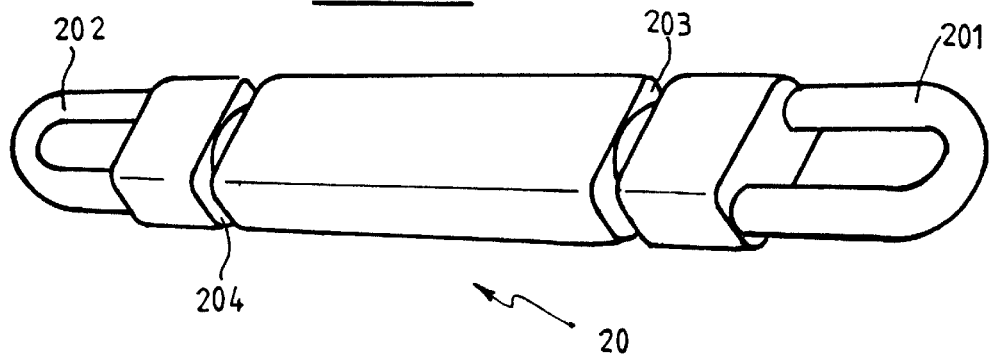
Figure 2:
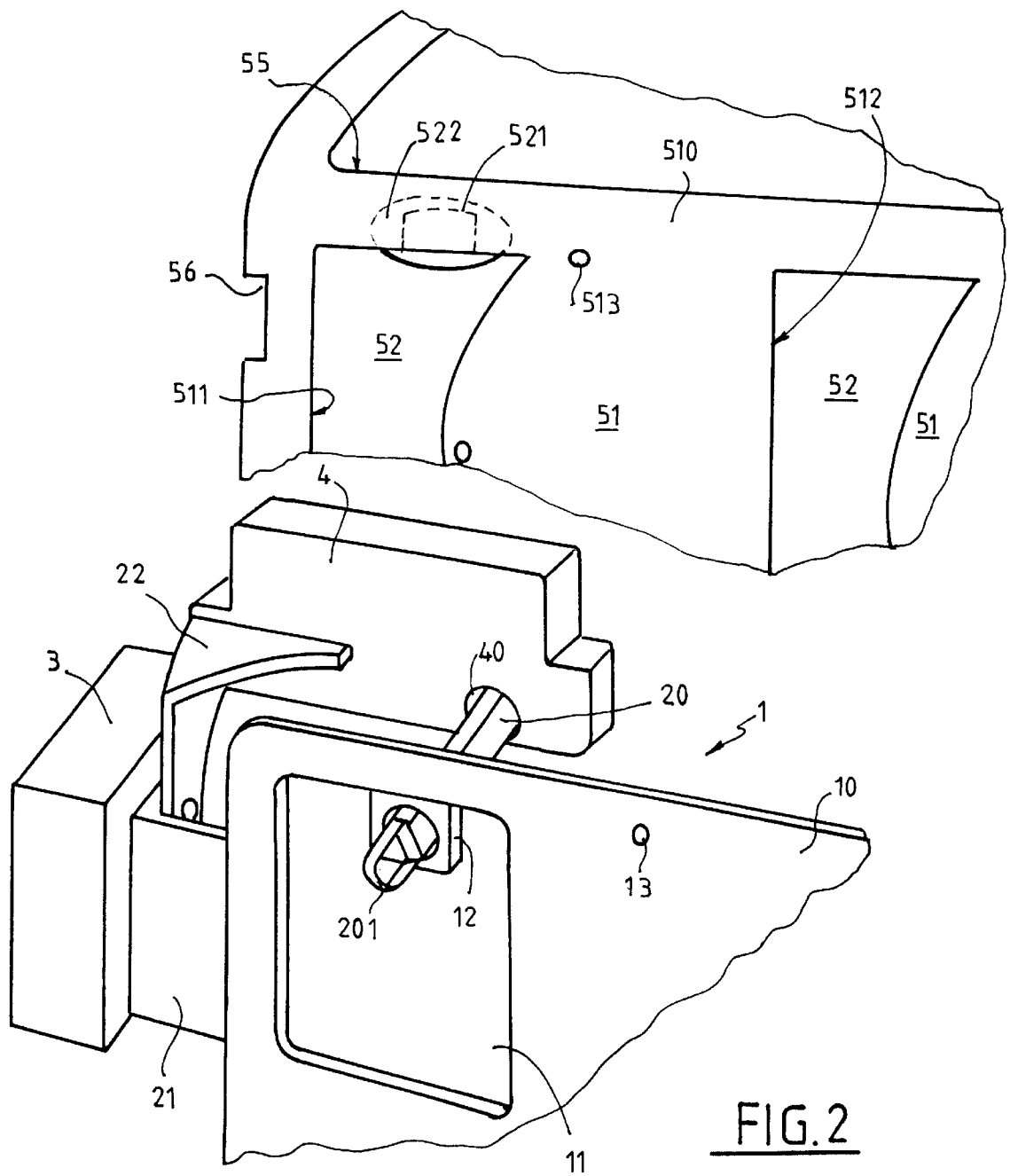
Figure 3:
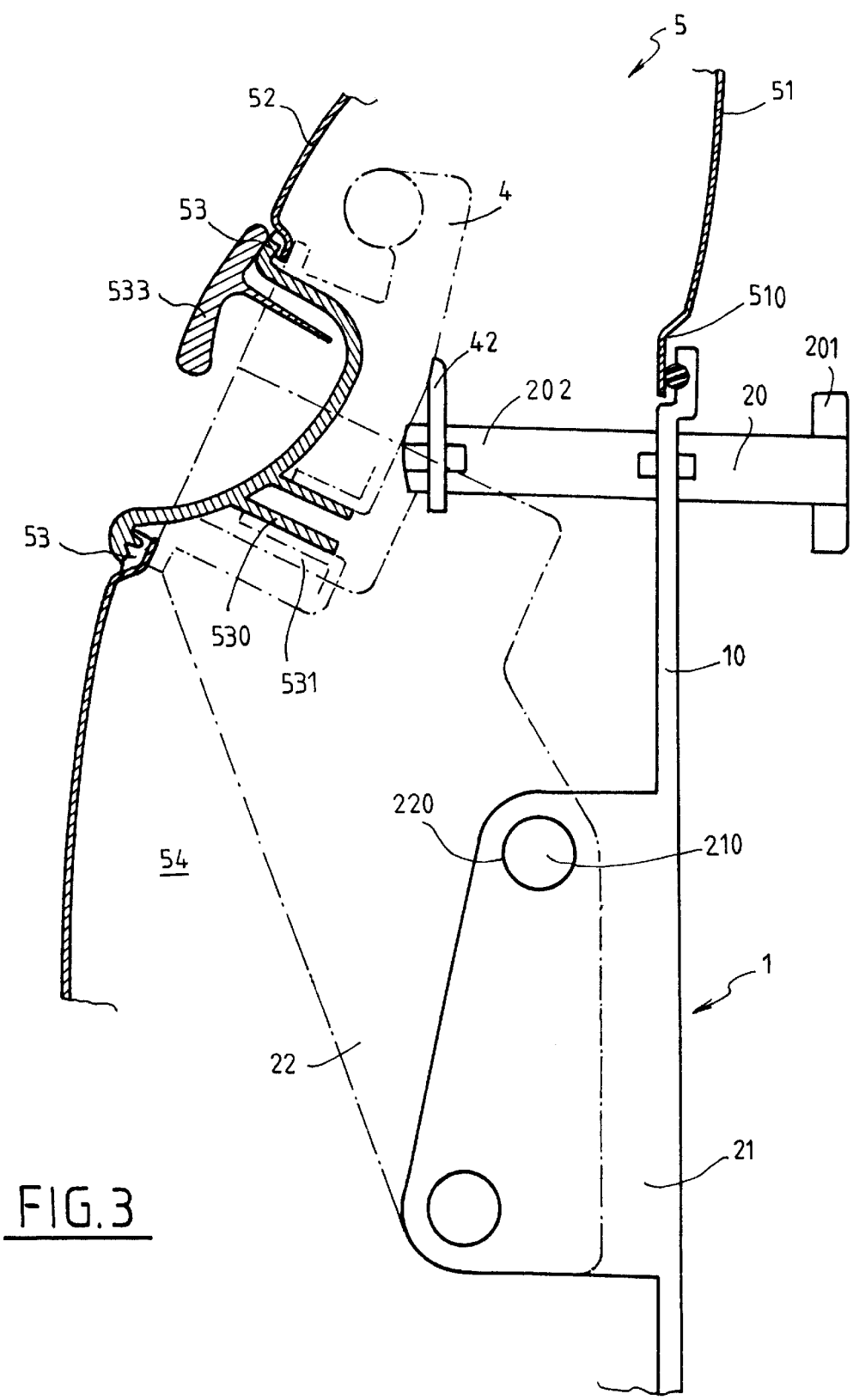
Figure 5A:
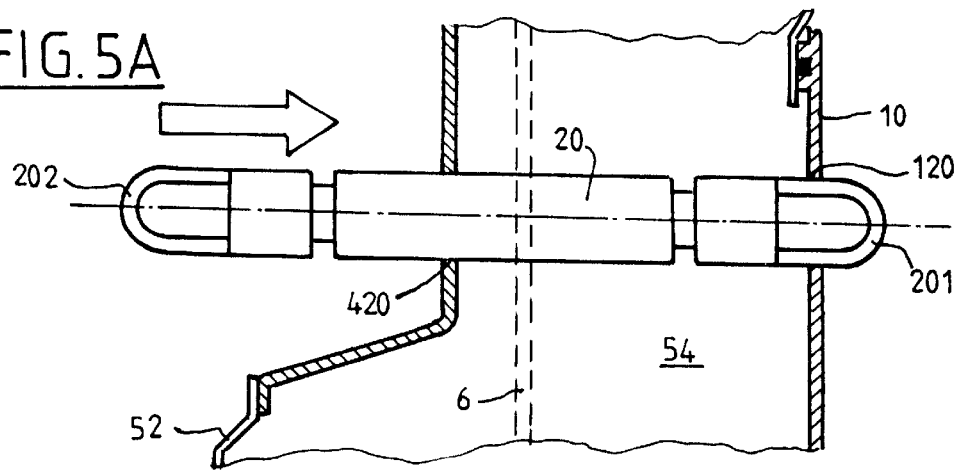
Figure 5B:
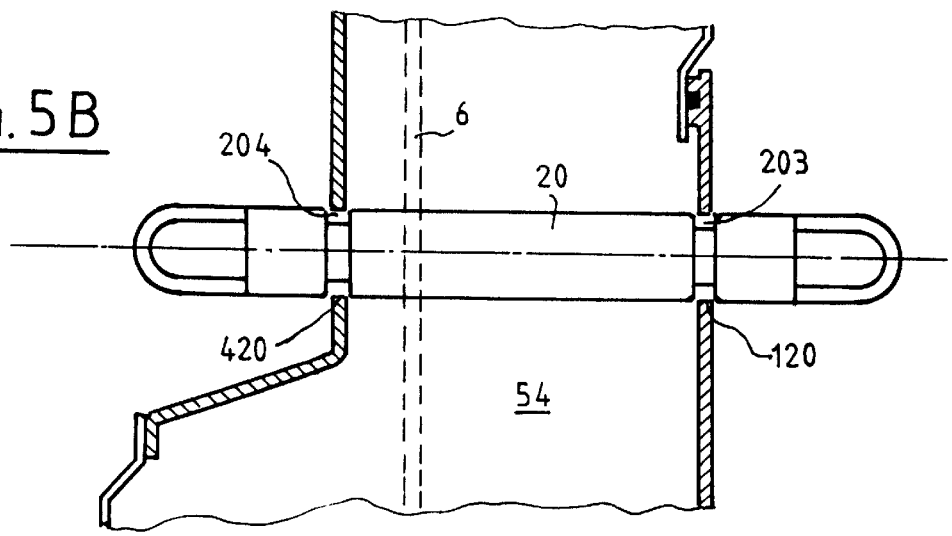
Figure 5C:
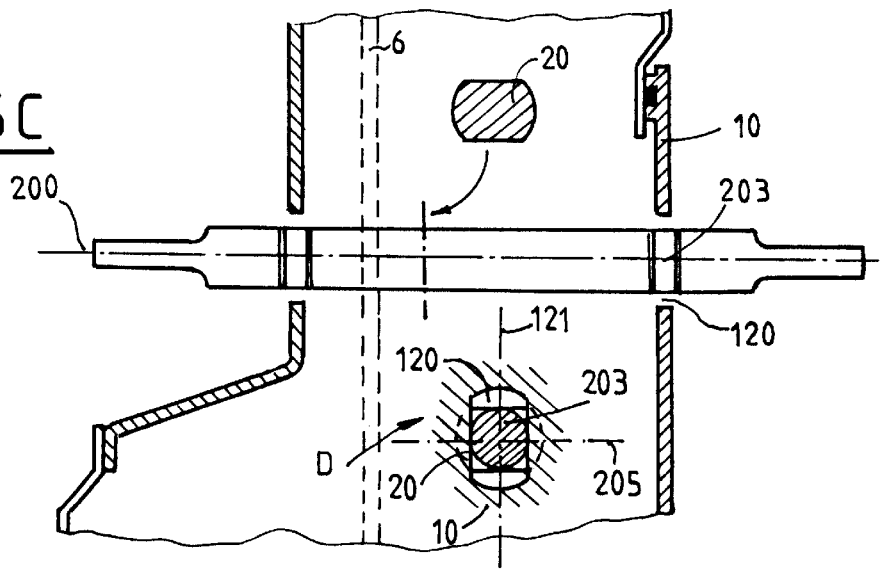
Figure 8A:
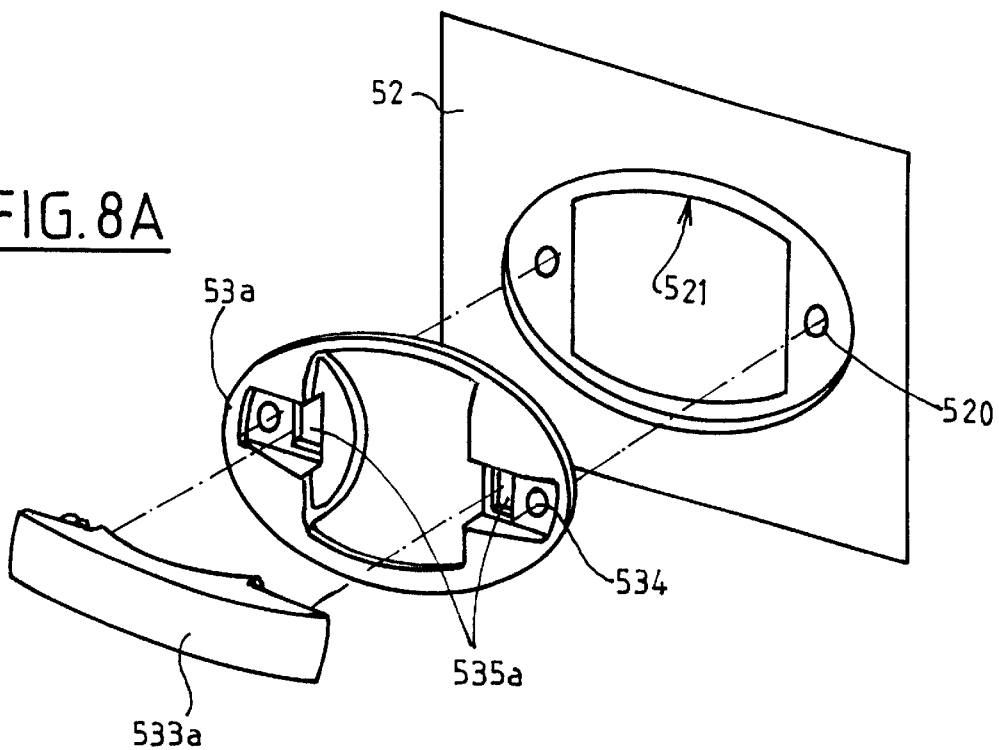
Figure 8B:
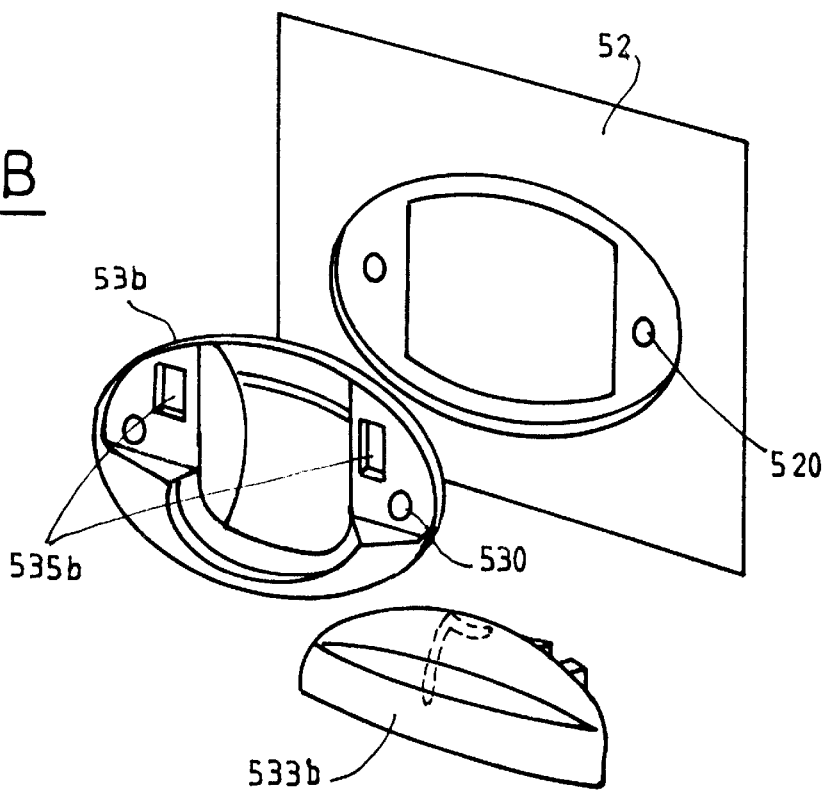
Figure 9:
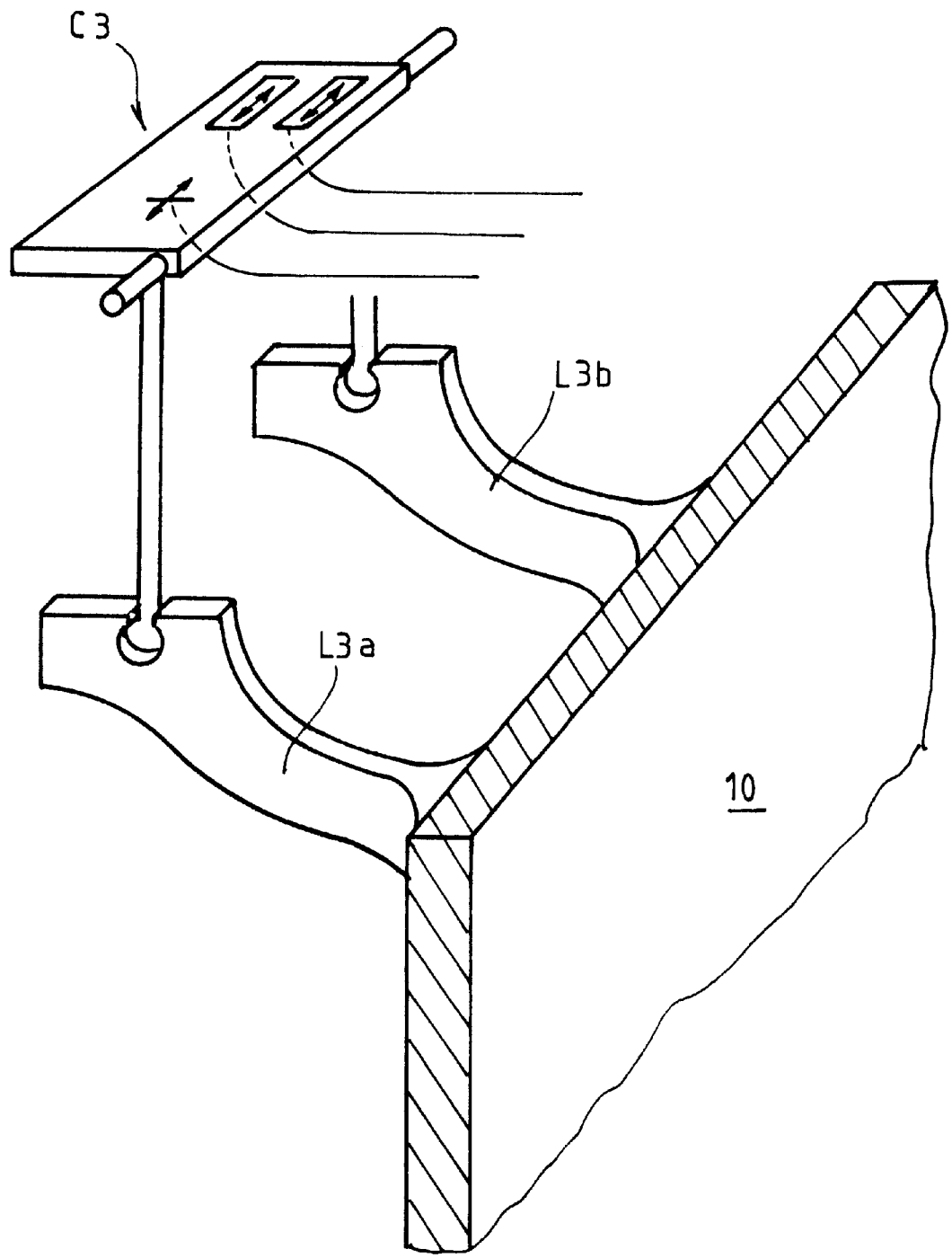

Other features and advantages of this invention will become clearer after reading the following description with reference to the attached drawings in which:

FIG. 1 shows a simplified scheme of the device for implementation of the process, FIG. 2 shows a scheme of the device for implementation of the process according to the invention, FIG. 3 shows a cross sectional view of a first variant embodiment of the device according to the invention, FIG. 4 shows an example embodiment of a removable connecting means, FIGS. 5A to 5C show the different steps in the placement and removal of the example embodiment of the removable connection means in FIG. 4, FIGS. 6A to 6C show different steps in the placement and retraction of a first variant embodiment of a retractable connection means, FIGS. 7A to 7C show the different steps in the placement and retraction of a second variant embodiment of a retractable connection means, FIGS. 8A and 8B show a first and second variant embodiment of an external box for a door opening control, respectively, FIG. 9 shows a perspective view of one use of the process defined with regard to FIG. 1.

FIG. 1 shows a simplified scheme of the principle of the invention that consists of forming rigid links L1, L2, L3 on a multifunction plate (10), in order to control the position in space of each of components C1, C2, C3 to be installed blind in housings provided for C1 in a second wall (52), for C2 in the same wall (51) and for C3 in a third wall (53). The multifunction plate is positioned in a housing or a recess (510) enabling its positioning on the wall (51). This wall (51) is also provided with orifices (511 and 512) that are sufficiently large to enable the component and the link positioning this component in the space to pass through. When the plate is put into position in its housing (510), each of the components C1, C2 and C3 is positioned facing its respective housing. The process then consists of fixing the component to an external part that grips the wall (52) between C1 and this external part like a sandwich. The reader will obviously realize that each of the links enables three-dimensional positioning of component C1, in other words link L1 enables Z and Y displacements with respect to the attachment point on the plate (10), and also an X displacement, in other words perpendicular to the plane formed by the sheet, for example to position the component C1 at a given distance above the sheet. The same can be true for links L2 and L3. One application of the process concerns opening parts of a vehicle, namely the side doors, rear door or engine hood. Thus in a side door, the wall (52) is the external wall of the side door, and wall (53) forms the internal cladding of the side door. Component C3, as shown in FIG. 9, may be a keyboard of switches controlling the electrical windows located on the plane part of an elbow rest formed in a recess (530). The component C1 may be the external opening control for side doors to activate the vehicle lock.

FIG. 2 shows an application of this type of process according to the invention in which the cutout (521) used to attach the external part CE on component C1 that is composed of the external opening control (4) which is mechanically connected to the side door lock (3), and the complete assembly is connected by a link (21–22) to the multifunction plate (10). The side door comprises a first internal wall (51) provided with two cutouts (511–512) through which the inside face of the external wall at 52 can be seen, and that defines the volume of the side door into which the window can be retracted. The line (510) defines the recess contour forming positioning means for the multifunction plate (10). The window well is accessible through the lower edge (55) forming the door frame. The lock case (3) fits into a cutout (56). The external part CE that is fixed on the component (4) is shown in FIGS. 8A and 8B, and is composed of cladding (53 or 53B), that is screwed together with the wall (52) and component C1 forming a sandwich, and this cladding (53) is provided with openings (535) used to clip a maneuvering device (533) in complementary elements provided for this purpose in the door external opening control forming component C1.

FIG. 2 shows a scheme of the device used to implement the process according to the invention. For example, the device according to the invention may be installed on a cassette (1) of a vehicle opening element such as a side door or a rear door. For example, the description is made for a side door, but will be equally applicable for a rear door. The top part of a vehicle side door consists of a window frame in which a window will be fitted, and the lower part under the frame comprises a closed hollow volume composed of a first wall or external skin and an inner skin in which there is at least one opening. The hollow volume forms a well into which the window will be fitted when it is lowered. As a general rule, a side door cassette (1) comprises a wall (10) that will close the opening formed in the inside wall of the side door in order to delimit a closed volume. According to the invention, the wall (10) of a cassette (1) is shaped to hold at least one connecting means (20, 21, 22) that will be used to fix at least one internal element (3, 4) in the side door and fix all internal elements (3, 4) in rotation and in translation with respect to the cassette (1). These internal elements (3, 4) or components will perform particular functions of the side door. As a non-limitative example, the first component may be the side door locking mechanism (3) and the second component may be the functional part of the external opening control (4) referred to as the "COE" in the rest of this description. The connecting means (20, 21, 22) are shaped to not occupy the space necessary for the window or the door well, or so that they can either be removed or retracted if they occupy part of the door well. Thus, the connecting means (20, 21, 22) comprise firstly at least one fixed connecting means (21, 22) used to fix the side door components (3, 4) to the wall (10) of the cassette (1) without closing off the door well, and secondly at least one removable or retractable connecting means (20) that fixes the component (4) designed to fit inside the external wall of the door, in rotation and in translation.

The fixed connecting means (21, 22) comprise for example at least one attachment tab (21, 22) or lug. Each tab (21, 22) comprises firstly means of assembly with at least one side door component (3, 4), and secondly means of assembly either on the cassette (1) or on another means of connection. In the example embodiment in FIG. 1, the first tab (21) installed on the wall (10) of the cassette (1) fixes the side door locking mechanism (3) and a second tab (12) installed on the first tab (21) fixes the lock to the functional part of the external opening control (4). Thus, these tabs (21, 22) fix the side door components (3, 4) with the cassette (1) and therefore facilitate placement of components (3, 4) in the door that will subsequently be assembled on the door. These tabs (21, 22) are shaped so that they do not enter into the door well (54). However, due to the constraint by which the door well needs to be left open to allow passage of the window (6), the components (3, 4) must be positioned and then completely fixed in translation and in rotation with respect to the cassette (1) to avoid any risk of them shifting during final assembly of the components (3, 4) in the side door. In order to do this, they are fixed by at least one removable or retractable connection means (20) described in detail later. In the example embodiment shown in FIG. 1, the removable connection means (20) is composed of a rod (20) fixed firstly to the external opening control (4) and secondly to the wall (10) of the cassette (1). The connection between the rod (20) and the wall (10) of the cassette (1) may be formed by a tab (12) in which a drilling is made. The tab is formed in a cutout (11) in the wall (10). The drilling, with defined dimensions and geometry, may be made directly in the wall (10). The rod (20) is then inserted in the drilling (12) of the wall (10), and in a second drilling (41) formed in part of the external opening control (4). Thus, once the components (3, 4) have been fixed to the wall (10) of the cassette (1) by means of the tabs (21, 22), this rod (20) locks the components (3, 4) in an optimum position for their attachment in the door. This rod (20) is assembled on the cassette and on the functional part of the external opening control (4) such that an operator can remove the rod (20) once all the components (3, 4) have been installed in the door, by means of a gripping means (201) located on a first end of the rod (20) and projecting beyond the external face of the wall (10) of the cassette (1).

FIG. 3 shows a cross sectional view through a first variant embodiment of the device according to the invention. In this view, the cassette (1) is installed on the inside wall (51) of a side door (5) in which at least one opening is cutout. A decorative element (53) or external part of the door opening control comprising the handle (533) controlling the functional part (4) of the COE, used to open the side door (50) and a decorative cladding, could be fitted on the external part of the external wall (52) of this side door (5). This external part (53) also comprises means (530) for assembly of the external opening part (COE) (4) in the door (5) and consequently contains complementary means (42) for assembly on the external part (53). The external part (53) comprises means (533) for attachment of the external wall (52)of the door (5), and means of attachment of the door handle (533b). The external wall (52) may comprise a stamped part for positioning and/or centering the external part (53) during its assembly. There are also drillings in the external wall (52) that will be used to allow passage of elements fastening the COE onto the external part, so that once the assembly has been made, the wall (52) is trapped between the external part (53) and the COE (4) so that the COE can be fixed in position. For example, the attachment elements comprise pins that also position this COE (4). The mechanical link between the external part (53) and the COE (4) is then made using screws screwed into the spindles. The COE assembly means (530) and complementary assembly means (42) are located in an internal volume (54) of the door delimited by the two walls (51, 52) of the side door. For example, these means (530, 42) of assembling the COE comprise screw wells (530) on the external part (53) shaped to penetrate into the spindles (531) made on the COE, in this case the connection between the external part and the COE (4) being created by screws adapted to the screw wells (530) in the external part (53). In this first variant embodiment, the first tab (21), could form an integral part of the wall (10) of the cassette (1) and projects into the inside volume (54) of the door (5). For example, this first tab (21) comprises two drillings (210) intended for assembly of the second tab (22) through a screw/nut system, the second tab (22) then comprising two complementary drillings (220). In this first variant embodiment, the removable connecting means (20) are also composed of a rod, the second end (202) of which may for example cooperate with a tab (41) fixed to the COE (4) to prevent translation and rotation of all internal components of the side door. The link between the rod (20) and the tab (41) of the COE (4), and between the rod (20) and the wall (10) of the cassette (1) will be described later.

FIG. 4 shows an example of embodiment of a removable connecting means. As explained above, a removable connecting means may for example consist of a rod (20). For example, this rod (20) could be composed of a cylindrical bar on which two parallel flats are formed. The dimensions and geometry of the cross section of the rod (20) are essentially the same as the dimensions and geometry of the drilling in the tab or the drilling (12) in the wall (10, FIG. 2) of the cassette (1) and the drilling (41, FIG. 2) in the COE or the drilling in the tab (42, FIG. 3) of the COE. Each end (201, 202) of the rod (20) comprises gripping or manipulation means (201, 202) that may for example be composed of a handle (201, 202). This rod (20) also comprises locking means (203, 204) designed for enabling assembly and disassembly of the rod (20) on the cassette, and for example the COE or a tab of the COE. For example, these locking means (203, 204) comprise two grooves formed around the entire circumference of the body of the rod (20). The thickness of each groove (203, 204) is essentially equal to the thickness of the wall (10, FIG. 2) of the cassette and the thickness of the tab on the COE. The dimensions of the grooves (203, 204) are chosen such that the cross-section of the rod (20) is cylindrical at the grooves. Furthermore, the diameter of the cylinder is less than or equal to the thickness of the rod (20).

FIGS. 5A to 5C show the different steps in the placement and removal of the removable connecting means in the example embodiment in FIG. 4. The rod (20), shown in FIG. 5A, is initially inserted between the wall (10) of the cassette and, for example, a tab (42) on the COE, through the drilling in the cassette wall (10), and through the drilling (420) in the tab (42). The rod (20) may be inserted either by beginning by inserting the rod (20) through the drilling (120) in the wall (10), or by beginning by inserting the rod (20) through the drilling (420) in the tab (42). The rod (20), shown in FIG. 5B, is inserted as far as the first groove (203) facing the drilling (120) in the wall (10), or as far as the second groove (204) facing the drilling (420) in the tab (42). Therefore, at this stage, the rod (20) can rotate around its longitudinal axis (200). The dimensions of the rod (20) at the grooves (203, 204) are smaller than the dimensions of the drilling (120) in the wall (10), and the drilling (420) in the tab (42). Thus, FIG. 5C shows the rod (20) after an operator has rotated it by a quarter turn in either direction. Once the rotation has been made, the rod (20) is locked in translation, since as shown in the cross section (D) at the first groove, the longitudinal axis (205) of the cross section of the rod (20) is no longer parallel to the longitudinal axis (121) of the drilling (120) in wall (10). In this position, the rod (20) is locked between the wall (10) and the COE, and therefore assembles and locks the COE in translation and in rotation with respect to the cassette, which facilitates assembly of the COE and possibly other components of the side door. In order to remove the rod (20) and thus leave the door well (54) free, all that is necessary is to rotate the rod (20) by another quarter turn so that the longitudinal axis of the cross section of the rod (20) is parallel to the longitudinal axis of the drilling (120) in wall (10). Once the rotation has been made, the configuration shown in FIG. 5C is obtained. Thus, the rod (20) is no longer locked in translation, and may for example be withdrawn in the direction opposite to the direction in which it was inserted.

Figure 6A:
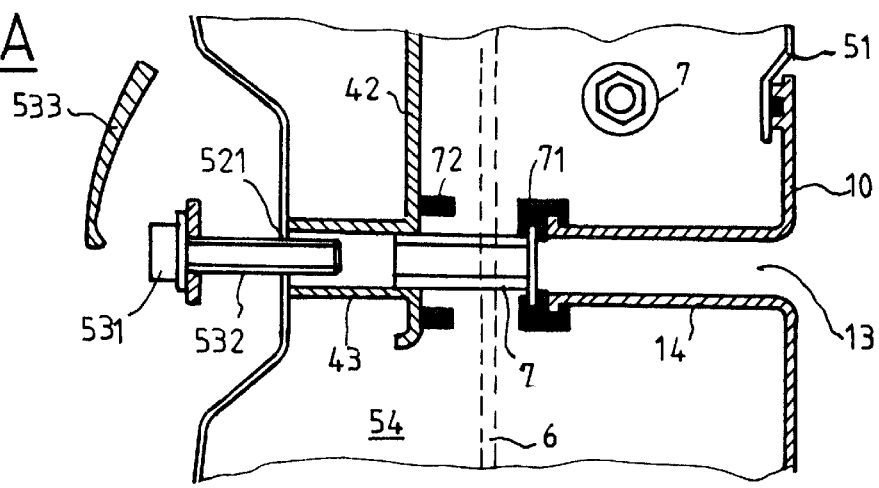
Figure 6B:
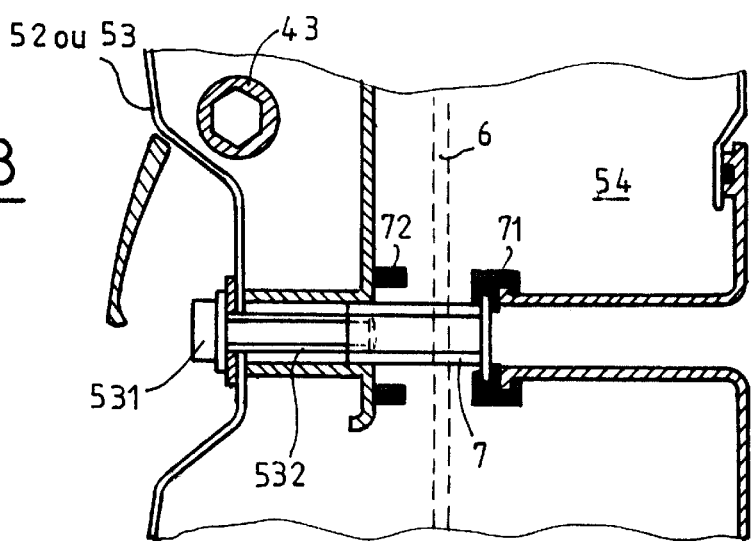
Figure 6C:
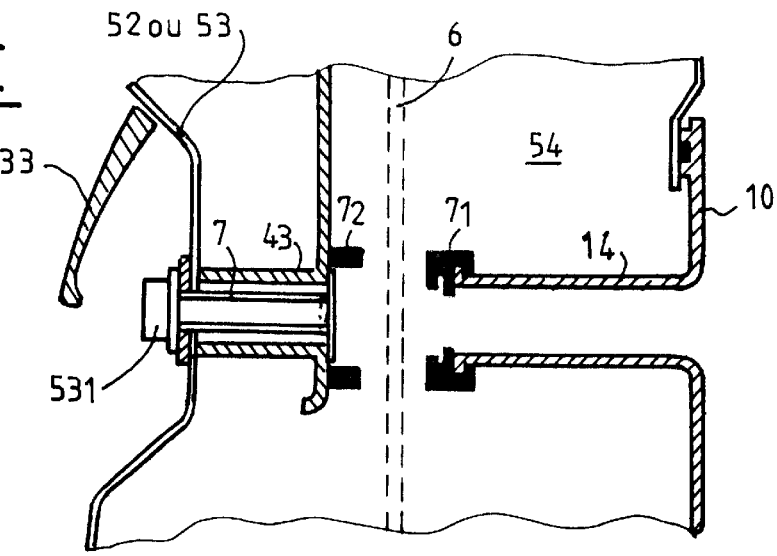

FIGS. 6A to 6C show the various steps in the placement and retraction of a first variant embodiment of a retractable connection means. In this variant embodiment, the connection means that locks the assembly in rotation and translation cannot be removed but it can be retracted, in other words it is not removed once all door components have been assembled in the side door, but simply maneuvered in order to leave the side door well (54) free. For this purpose, the wall (10) of the cassette comprises an opening (13) prolonged towards the well (54) in the side door through a tube (14). The end of this tube (14) located inside the well (54) comprises a joint (71) into which a first end of a nut (7), or tapped sleeve is inserted, the second end of which is engaged in a first end of a sleeve (43) formed in the tab (42) or extension of the COE. The geometry and dimensions of the sleeve (43) are approximately the same as the geometry and dimensions of the nut (7) such that the only possible movement of the nut (7) in the sleeve (43) is by sliding. The second end of the sleeve (43) faces a drilling (521) formed in the external wall (52) of the door and designed to be fitted with a screw (531) enabling the attachment of the external part (53) on the external wall (52) of the side door, on which the door handle (533b) is fitted. FIG. 6A shows the positioning step for a side door component, for example the COE. As explained above, the COE is fitted on the wall (10) of the cassette, particularly by means of nut (7). The cassette is then installed in the side door. The next step, for the variant embodiment shown in FIG. 6A to 6C, consists of fixing the COE to the side door and installing the external part (534) onto the external wall (52) of the side door. This step is shown in FIG. 6B and consists firstly of engaging the threaded rod (532) of the attachment screw (531) fixing the external part (53) into the sleeve (43) of the tab (42), and then into the nut (7). When the screw (531) is engaged in this way, the screw head is stopped in contact with the external wall (52) of the side door. The final step shown in FIG. 6C consists of screwing in the screw (531). This operation then causes the nut (7) to slide in the sleeve (43) towards wall (52), since the head of screw (531) is stopped in contact with the external wall (52) of the side door. Sliding of nut (7) then leaves the well (54) free in the side door inside which the window (6) is free to slide. For example, a second joint (72) may be fixed to the tab (42) facing the joint (71) of the sleeve (14) of the cassette wall (10). These two joints (71, 72) protect the glass (6) against possible shocks.

Therefore, this first variant embodiment enables attachment of the external part and assembly of the COE in the door frame by a screwing operation made on the external wall (52) of the side door.

FIGS. 7A to 7C show different steps in the placement and retraction of a second variant embodiment of a retractable connecting means. This second variant embodiment enables attachment of the external part (53) and assembly of the COE in the side door by a screwing operation made by the cassette wall (10). Consequently, the cassette wall (10) is the same as in the first variant. On the other hand, the nut is replaced by a screw (8) in which the screw head is accessible through the tube (14) of the wall (10). The tab (42) is also the same as in the first variant. On the other hand, the contact between the COE and the external wall (52) of the side door is no longer formed by the second end of the sleeve (43), but rather by an extension (44) of the tab (42). In this second variant, the external part (53) could for example be a decorative case that conceals an opening formed in the external wall (52) of the side door. The external part (53) comprises a sleeve (541) on the face that cannot be seen from the outside, that has dimensions and geometry such that it can be inserted in the sleeve (43) of the tab (42) of the COE. Thus, after the COE has been assembled on the cassette wall (10) as shown in FIG. 7A and made in the same way as it was made in the first variant embodiment, the external part (53) is fixed to the COE. As shown in FIG. 7B, it is fixed by inserting the sleeve (541) of the external part (53) into the sleeve (43) of the tab (42) on the COE. Once fixed, the external part (53) is then stopped in contact with the external wall (52) of the side door and the end of the rod (80) is engaged in the sleeve (541) of the external part (53). As shown in FIG. 7C, the external part (53) is permanently fixed and the well (54) is left free by screwing screw (8) into the sleeve (541) of the external part (53), which could be fitted with a threaded insert for this purpose. Thus, once the screwing operation has been terminated, the screw (8) is completely engaged inside the sleeve (541) of the external part (53) such that firstly the screw head is stopped in contact with the tab (42) on the COE, and secondly the screw (8) has left the side door well (54) free. Two joints (71, 72) identical to the joints described for the first variant, may also be used.

FIGS. 8A and 8B show first and second variant embodiments of an external box or external part of a door opening control. As described above, the external part (53a, 53b) is mounted on the external wall (52) of the side door by assembly means comprising firstly at least two screw wells (534) on the external part (53a, 53b), and secondly corresponding drillings (520) on the side door wall (52). These drillings (520) are also used for the assembly of the COE on the external part (53a, 53b), for example through positioning spindles and screws. The external part (53a, 53b) also include means (535a, 535b) for connecting the door handle (533a, 533b) to the external opening control (COE). In the first variant, the handle (533a) pivots about a vertical axis, whereas in the second variant the handle (533b) pivots about a horizontal axis.

Thus as described above, the process according to the invention comprises firstly a step in which the internal components or elements of a side door are assembled on the cassette. This assembly can then be assembled in the side door in a second step. Finally, the last step consists of releasing the door well either by removing the removal means, or by retracting the connection means locking it in rotation and in translation. The variant embodiments shown in FIGS. 6A to 6C and 7A to 7C are used for the step in which the component is assembled in the side door and the well is left free at the same time.

It can be seen that the process and the device according to the invention facilitate the operation to assemble components inside a side door. All components may be positioned so that they can be assembled blind in the side door in a single operation that consists of inserting the cassette into the side door, equipped with its various components. Finally, the different variant embodiments of the removable or retractable connection means depend firstly on the configuration of the components and the side door, and secondly the user's choice about whether or not connection means used to lock all components will be reused.

It is obvious that an expert in the subject would be capable of making other modifications within the scope of the invention.

What is claimed is:

1. A process for blind assembly of at least one component within a housing having difficult and limited access thereto, comprising the steps of:

providing a removable link with a multi-function plate for positioning the component;

forming a hole in a first wall of the housing through which the link and the component in their entirety can pass;

passing the link and the component through the hole in the first wall;

positioning the multi-function plate in said hole in said first wall to position the component in space and in a predetermined position within the housing; and adding one or more additional elements onto the component.

2. A process according to claim 1 including providing a second wall in part defining said housing with said first wall.

3. An assembly process according to claim 2 wherein a second wall forms a volume with a first wall.

4. A process according to claim 3 wherein the volume is a vehicle door opening element.

5. A process according to claim 1 wherein the housing is a vehicle door, the additional elements including a cladding component and a maneuvering component for cooperation with the first mentioned component to maneuver the door.

6. A process according to claim 1 including providing the link rigid along X and Y axes and rendering the link rigid along a Y axis using a key.

7. A process according to claim 1 wherein the multi-function plate comprises a vehicle door cassette.

8. A process according to claim 7 including providing a first external wall and a second internal wall defining a volume forming an opening element for a vehicle;

rigidly attaching the component on the multi-function plate using an attachment;

fixing the plate in a housing provided on said second internal wall and positioning the component on an inside face of the first external wall of the opening element;

removing the attachment from the multi-function cassette and assembling external maneuverable and cladding elements.

9. A process according to claim 8 wherein the opening element is a side door or a rear door of a vehicle, wherein the step of removing the attachment includes freeing the space between the two walls forming a well for a movable element, said component comprising a functional part of an external control for moving the movable element.

10. An assembly process according to claim 9, wherein the movable element is a window.

11. A process according to claim 9 including providing a door opening control, assembling the external part of the door opening control, assembling the external control by clamping the wall between the external part and a functional part of the external control.

12. An assembly process according to claim 11, wherein the door opening control comprises a maneuvering device on the inside of the door.

13. An assembly process according to claim 11, wherein the door opening control comprises a cladding on the inside of the door.

14. A process according to claim 8 wherein the step of attaching includes releasably locking a removable link element comprised of a rod to the second wall and said one component or one of said elements to be assembled in the inside of the volume and unlocking the removable link element subsequent to placing and fixing the component by unlocking the rod from the second wall and the one component or one of said elements to leave a space between said walls volume-free.

15. A process according to claim 8 including fixing each element to the external wall of the side door.

16. An assembly process according to claim 15, wherein the step in which the group formed by the cassette and all internal elements inside a vehicle door is assembled and fixed consists secondly of fixing at least one mechanism of each element to a mechanism of the cassette.

17. A process according to claim 8 wherein the attachment includes a tapped sleeve with an attachment means, the tapping in the sleeve being designed to cooperate with an attachment screw fastening and external part, the step of retracting the sleeve including turning the attachment screw when the inside element is fixed to the opening element.

* * * * *